United States Patent
Marchant et al.

(10) Patent No.: US 9,238,210 B2
(45) Date of Patent: Jan. 19, 2016

(54) BAFFLE SYSTEM FOR FLUID CATALYTIC CRACKING

(71) Applicants: Paul Marchant, Katy, TX (US); Wendell A Prothow, Humble, TX (US)

(72) Inventors: Paul Marchant, Katy, TX (US); Wendell A Prothow, Humble, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 221 days.

(21) Appl. No.: 14/135,637

(22) Filed: Dec. 20, 2013

(65) Prior Publication Data

US 2015/0174545 A1 Jun. 25, 2015

(51) Int. Cl.
*B01J 8/04* (2006.01)
*B01J 8/18* (2006.01)
*B01J 8/24* (2006.01)
*B01J 38/06* (2006.01)
*B01J 8/34* (2006.01)
*C10G 11/18* (2006.01)

(52) U.S. Cl.
CPC *B01J 8/1872* (2013.01); *B01J 8/24* (2013.01); *B01J 8/34* (2013.01); *B01J 38/06* (2013.01); *C10G 11/18* (2013.01); *B01J 2208/0084* (2013.01)

(58) Field of Classification Search
CPC .......................................................... B01J 8/04
USPC .......................................................... 422/645
See application file for complete search history.

(56) References Cited

U.S. PATENT DOCUMENTS

| | | | |
|---|---|---|---|
| 5,462,717 | A | 10/1995 | Pfeiffer |
| 6,224,833 | B1 | 5/2001 | Rall |
| 6,680,030 | B2 | 1/2004 | Koebel et al. |
| 7,179,427 | B2 | 2/2007 | Marchant |
| 7,799,286 | B2 | 9/2010 | Mehlberg |
| 8,062,507 | B2 | 11/2011 | Lambin et al. |

*Primary Examiner* — Edward Johnson
(74) *Attorney, Agent, or Firm* — Gary M. Machetta (57) ABSTRACT

Systems and methods for contacting solids with a fluid are provided. The system can include a first baffle having a latitudinal centerline that is in a plane defined by first and second axes, the latitudinal centerline of the first baffle being oriented at a first angle from about 5° to about 80° with respect to the second axis. The system can also include a second baffle axially offset from the first baffle along the second axis and having a latitudinal centerline in the plane that is oriented at a second angle from about 100° to about 175° with respect to the second axis and a third baffle axially adjacent to the second baffle along the second axis and having a latitudinal centerline in the plane that is oriented at a third angle from about 5° to about 80° with respect to the second axis.

16 Claims, 4 Drawing Sheets

BAFFLE SYSTEM FOR FLUID CATALYTIC CRACKING

BACKGROUND

1. Field

Embodiments described herein generally relate to systems and methods for hydrocarbon processing. More particularly, such embodiments relate to systems and methods for stripping entrained gas from a catalyst in FCC processes.

2. Description of the Related Art

Fluidized Catalytic Cracking ("FCC") is used to produce transportation fuels such as diesel, gasoline, and other liquid and/or gaseous hydrocarbon products from higher molecular weight feedstocks. The FCC process uses a reactor called a riser where fluidized catalyst particles thermally degrade or crack a higher molecular weight hydrocarbon to form more valuable, lower molecular weight hydrocarbon products. A by-product of the FCC process is a carbonaceous material known as "coke." Coke has a tendency to deposit on the catalyst particles, deactivating the catalyst. The lower molecular weight hydrocarbon products and the deactivated or spent catalyst particles are recovered from the reactor, and separated to provide a cracked hydrocarbon product and the spent catalyst.

The spent catalyst leaving the FCC riser can contain residual cracked hydrocarbons entrained thereon and/or therein. The spent catalyst is typically stripped in the presence of steam in a catalyst stripper to separate the residual cracked hydrocarbons. In the stripper, falling catalyst is distributed over a network of solid structures or baffles. The network of baffles can promote mixing of the falling catalyst with the upward flowing steam. The network of baffles used in conventional strippers contains rows of individual baffles that are arranged such that the surfaces of each baffle are co-aligned and/or co-planar with each other. During operation, rising gas bubbles have a tendency to coalesce along the underside of these baffles, which reduces stripping efficiency.

There is a need, therefore, for improved systems and methods for stripping catalyst of entrained gas in fluidized catalytic cracking processes.

DETAILED DESCRIPTION

Systems and methods for contacting solids with a fluid are provided. The system can include a first baffle having a latitudinal centerline that is in a plane defined by first and second axes, the latitudinal centerline of the first baffle being oriented at a first angle from about 5° to about 80° with respect to the second axis. The system can also include a second baffle axially offset from the first baffle along the second axis and having a latitudinal centerline in the plane that is oriented at a second angle from about 100° to about 175° with respect to the second axis and a third baffle axially adjacent to the second baffle along the second axis and having a latitudinal centerline in the plane that is oriented at a third angle from about 5° to about 80° with respect to the second axis.

Figure 1:
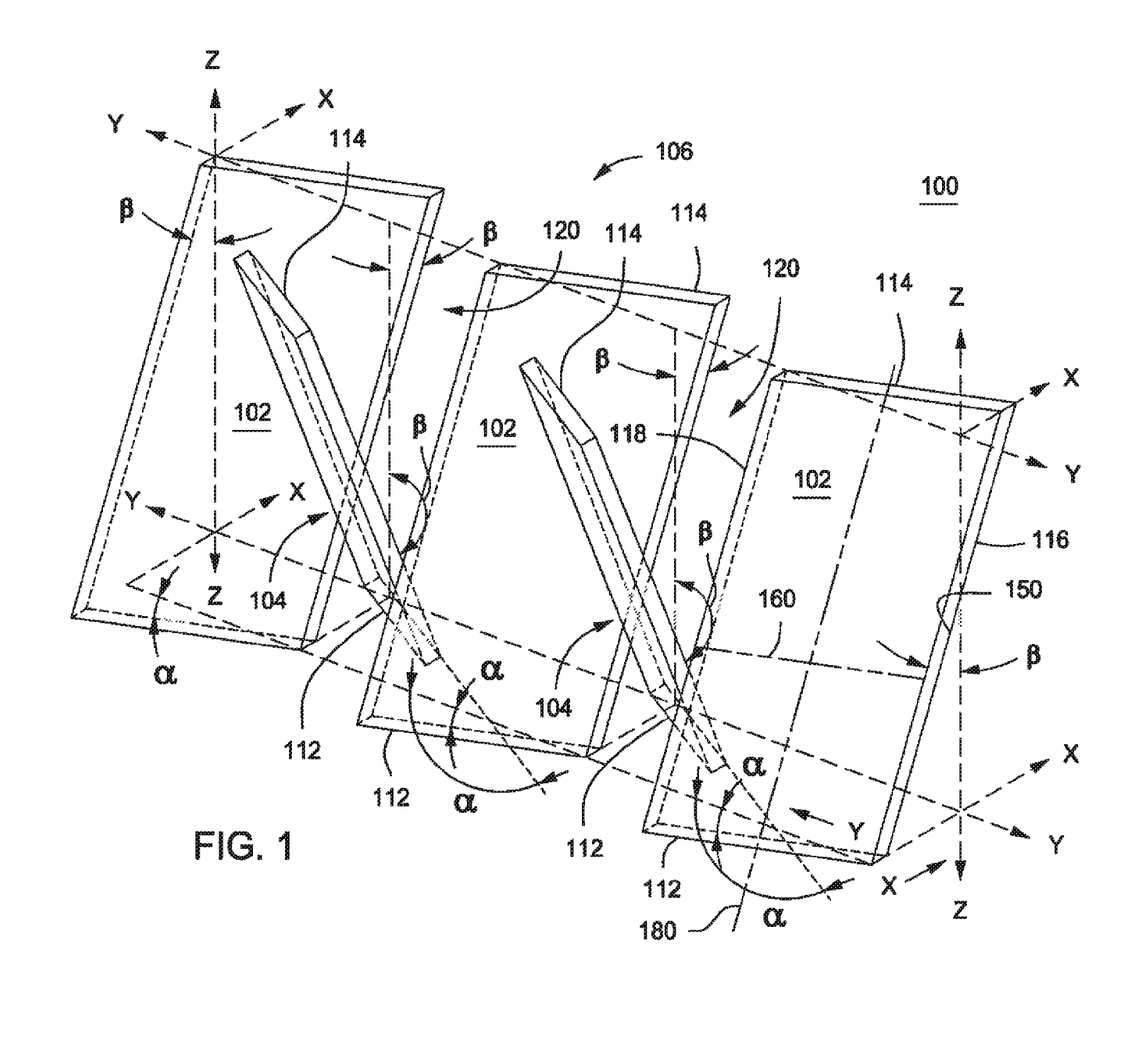
FIG. 1 depicts a schematic view of an illustrative baffle assembly, according to one or more embodiments disclosed.

FIG. 1 depicts a schematic view of an illustrative baffle assembly 100, according to one or more embodiments. The baffle assembly 100 can include any number of baffles 150 arranged adjacent to one another in a row 106. The baffle assembly can also include any number of rows 106. The baffles 150 can be configured, arranged, oriented, or otherwise positioned in the row 106 in a predetermined three-dimensional arrangement with respect to one another so that the major surfaces of each baffle lie in planes that are not co-aligned and/or co-planar with each other. The baffles 150 can be arranged having the same or different orientations in the row 106. For example, the baffles 150 arranged in the row 106 can include one or more baffles 150 having a first orientation 102 and one or more baffles 150 having a second orientation 104.

Each row 106 of the baffle assembly 100 can include baffles 150 each having a latitudinal centerline 160 that is in a plane defined by first and second axes. Each row 106 of the baffle assembly 100 can include a baffle 150 having a first orientation 102, or first baffle. The latitudinal centerline 160 of the baffle 150 having the first orientation 102 can be oriented at a first angle from about 5° to about 80° with respect to the second axis. Each row 106 of the baffle assembly 100 can also include a second oriented baffle 150 having a second orientation 104, or second baffle, axially offset from the first baffle 102 along the second axis. The baffle 150 in the second orientation 104 can have a latitudinal centerline in the plane that is oriented at a second angle from about 100° to about 175° with respect to the second axis. Each row 106 of the baffle assembly 100 can further include a third baffle 150, having the first orientation 102, axially adjacent to the second baffle 104 along the second axis and having a latitudinal centerline in the plane that is oriented at a third angle from about 5° to about 80° with respect to the second axis.

Three axes are shown in FIG. 1, namely, the first or X-axis, the second or Y-axis, and a third or Z-axis, such as in a three-dimensional Cartesian coordinate system where each axis is perpendicular to one another. Each baffle 150 can have a latitudinal centerline that can be in the X-Y plane. As used herein, the term "latitudinal centerline" 160 refers to a centerline that is parallel to the shorter sides 112, 114 of the baffles 150. Each baffle 150 can also have a longitudinal centerline that can be in the Y-Z plane. As used herein, "longitudinal centerline" 180 refers to a centerline that is parallel to the longer sides 116, 118 of the baffles 150. As shown in FIG. 1, the row 106 is disposed along the length of the Y-axis.

Any two or more of the baffles 150 can be oriented at an angle α with respect to the Y-axis, as shown in FIG. 1. The angle α can be the angle between the latitudinal centerline 160 extending through each of the baffles 150 and the second axis, or Y-axis. The angle α can range from a low of about 5°, about 10°, about 15°, about 20°, about 25°, or about 30° to a high of about 50°, about 60°, about 65°, about 70°, about 75°, about 80° or more.

The baffles 150 can have any orientation with respect to the Y-axis. In an example, the baffles 150 can be arranged in an alternating pattern with respect to the Y-axis. More particularly, the baffles 150 in the first orientation 102 can be sloped in a first direction (e.g., each oriented at an angle α of less than 901, and the baffles 150 in the second orientation 104 can be sloped in a second direction (e.g., each oriented at an angle α of greater than 90°). For example, the angle α for the baffles 150 in the first orientation 102 can range from a low of about 5°, about 10°, about 15°, about 20°, about 25°, or about 30° to a high of about 50°, about 60°, about 65°, about 70°, about 75°, about 80° or more. For example, the angle α for the baffles 150 in the first orientation 102 can be from about 15° to about 80°, about 20° to about 70°, about 25° to about 40°, about 45° to about 75°, about 10° to about 55°, or about 35° to about 85°. The angle α for the baffles 150 in the second orientation 104 can range from a low of about 100°, about 105°, about 110°, about 115°, about 120°, or about 130° to a high of about 140°, about 155°, about 160°, about 165°, about 170°, about 175° or more. For example, the angle α for the baffles 150 in the second orientation 104 can be from about 100° to about 165°, about 110° to about 160°, about 140° to about 155°, about 105° to about 135°, about 125° to about 170°, or about 105° to about 145°.

One of the baffles 150 in the first orientation 102, or first baffle, can be positioned adjacent one of the baffles in the second orientation 104, or second baffle. Another one of the baffles 150 in the first orientation 102, or third baffle, can be disposed adjacent to the second baffle, such that adjacent baffles 150 alternate back and forth between the first orientation 102 and the second orientation 104 along the Y-axis. In another example (not shown), any two of the baffles 150 in the first orientation 102 can be disposed adjacent to one another and/or any two of the baffles 150 in the second orientation 104 can be disposed adjacent to one another. In a further example (not shown), any three or more of the baffles 150 in the first orientation 102 can be disposed adjacent to one another and/or any three or more of the baffles 150 in the second orientation 104 can be disposed adjacent to one another.

The angle α can be different for two or more baffles 150. For example, the angle α for the baffles 150 in the first orientation 102, or angle α', can differ from the angle α for the baffles 150 in the second orientation 104, or angle α", by at least about 0.5°, at least about 1°, at least about 2°, at least about 5°, at least about 10°, or at least about 20°. For example, angle α' can differ from angle α" by about 0.1° to about 179°, from about 5° to about 175°, from about 10° to about 150°, from about 25° to about 125°, from about 40° to about 100°, or from about 60° to about 90°. In an example, angle α' can be at least about 0.5°, at least about 5°, at least about 15°, at least about 25°, at least about 65°, or at least about 90° lower than angle α". In another example, angle α" can be at least about 0.8°, at least about 8°, at least about 20°, at least about 45°, at least about 65°, or at least about 95° higher than angle α'.

Each baffle 150 can also be oriented such that an angle β is formed with respect to the Z-axis as shown in FIG. 1. The angle β is the angle between the longitudinal centerline 180 extending through each of the baffles 150 and the third axis, or Z-axis. Any two or more of the baffles 150 can be oriented at an angle β with respect to the Z-axis, as shown in FIG. 1. The angle β can range from a low of about 5°, about 10°, about 25°, or about 30° to a high of about 45°, about 60°, about 75°, about 85°, or more.

The baffles 150 can have any orientation with respect to the Z-axis. In an example, the baffles 150 can be arranged in an alternating pattern with respect to the Z-axis. More particularly, baffles 150 in the first orientation 102 can be sloped in a first direction (e.g., each oriented at an angle β of less than 90°), and the baffles 150 in the second orientation 104 can be sloped in a second direction (e.g., each oriented at an angle β of greater than 90°). For example, the angle β for the baffles 150 in the first orientation 102 can range from a low of about 5°, about 10°, about 25°, or about 30° to a high of about 45°, about 60°, about 75°, about 85°, or more. For example, the angle β for the baffles 150 in the first orientation 102 can be from about 15° to about 80°, about 20° to about 70°, about 35° to about 60°, about 40° to about 55°, about 15° to about 45°, about 20° to about 40°, or about 35° to about 45°. In another example, the angle β for the baffles 150 in the first orientation 102 can be at least 2°, at least 8°, or at least 12° and less than 85°, less than 70°, or less than 65°. The angle β for the baffles 150 in the second orientation 104 can range from a low of about 95°, about 105°, about 120°, or about 135° to a high of about 150°, about 155°, about 170°, about 175°, or more. For example, the angle β for the baffles 150 in the second orientation 104 can be from about 100° to about 165°, about 110° to about 160°, about 120° to about 145°, about 125° to about 140°, about 135° to about 165°, about 140° to about 160°, or about 135° to about 155°. In another example, the angle β for the baffles 150 in the second orientation 104 can be at least 92°, at least 98°, or at least 102° and less than 178°, less than 162°, or less than 132°.

One of the baffles 150 in the first orientation 102, or third baffle, can be disposed adjacent to the second baffle, such that adjacent baffles 150 alternate back and forth between the first orientation 102 and the second orientation 104 along the Z-axis. In another example (not shown), any two of the baffles 150 in the first orientation 102 can be disposed adjacent to one another and/or any two of the baffles 150 in the second orientation 104 can be disposed adjacent to one another. In a further example (not shown), any three or more of the baffles 150 in the first orientation 102 can be disposed adjacent to one another and/or any three or more of the baffles 150 in the second orientation 104 can be disposed adjacent to one another.

The angle β can be different for two or more baffles 150. For example, the angle β for the baffles 150 in the first orientation 102, or angle β', can differ from the angle β for the baffles 150 in the second orientation 104 or angle β", by at least about 0.5°, at least about 1°, at least about 2°, at least about 5°, at least about 10°, or at least about 20°. For example, angle β' can differ from angle β" by about 0.1° to about 179°, from about 5° to about 175°, from about 10° to about 150°, from about 25° to about 125°, from about 40° to about 100°, or from about 60° to about 90°. In an example, angle β' can be at least about 0.5°, at least about 5°, at least about 15°, at least about 25°, at least about 65°, or at least about 90° lower than angle β". In another example, angle β" can be at least about 0.8°, at least about 8°, at least about 20°, at least about 45°, at least about 65°, or at least about 95° higher than angle β'.

Each baffle can be planar or substantially planar. As shown in FIG. 1, each baffle 150 can have a first end 112 and a second end 114, or shorter sides 112, 114, and a first side 116 and a second side 118, or longer sides 116, 118. A distance from the first end 112 to the second end 114 can be referred to as the length of each baffle 150, and a distance from the first side 116 to the second side 118 can be referred to as the width of each baffle 150. Each baffle 150 can have a length from a low of about 1 centimeter (cm), about 2 cm, about 5 cm, about 10 cm, about 20 cm, or about 30 cm to a high of about 50 cm, about 75 cm, about 1 meter (m), about 1.5 m, or about 2 m. For example, the length of each baffle 150 can be from about 3 cm to about 1 m, from about 6 cm to about 60 cm feet, from about 12 cm to about 30 cm, or from about 15 cm to about 20 cm. Each baffle 150 can have a width from a low of about 0.25 cm, about 0.5 cm, about 0.75 cm, about 1 cm, about 1.5 cm, or about 2 cm to a high of about 4 cm, about 8 cm, about 15 cm, about 25 cm, or about 50 cm. For example, the width of each baffle 150 can be from about 0.3 cm to about 20 cm, from about 0.75 cm to about 10 cm, from about 135 cm to about 7 cm, or from about 3 cm to about 5 cm. An alternating arrangement of the baffles 150 can result in a space or gap 120 being present between every other baffle 150. For example, a gap 120 can be present between baffles 102 and between baffles 104. The gap 120 can have a width that is the same as the width of the baffles 150.

Each baffle 150 can also have a thickness (not shown). Each baffle 150 can have a thickness from a low of about 0.001 cm, about 0.01 cm, about 0.05 cm, about 0.1 cm, about 0.15 cm, or about 0.2 cm to a high of about 0.3 cm, about 0.4 cm, about 0.5 cm, or about 1 cm. For example, the thickness of each baffle 150 can be from about 0.005 cm to about 0.8 cm, from about 0.02 cm to about 0.4 cm, from about 0.12 cm to about 0.35 cm, or from about 0.17 cm to about 0.25 cm.

Figure 2:
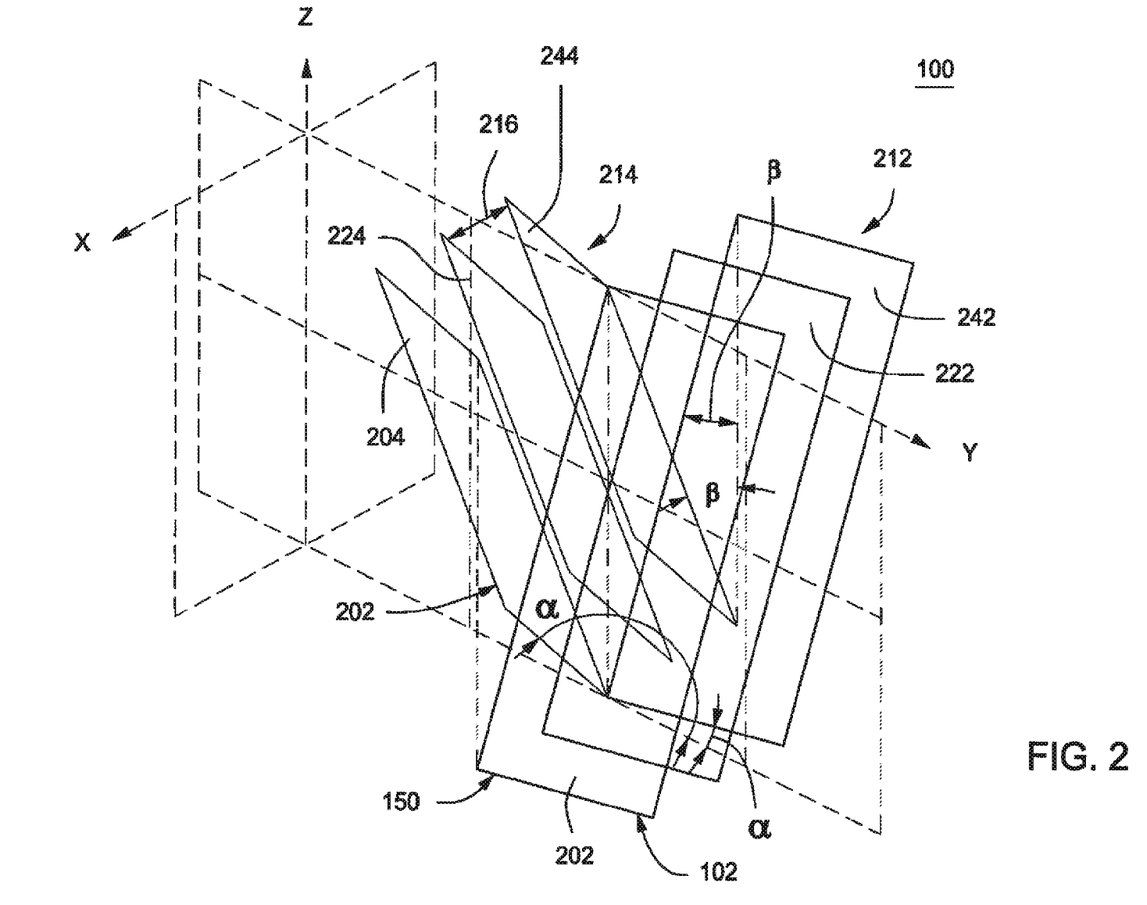
FIG. 2 depicts another schematic view of the illustrative baffle assembly, according to one or more embodiments disclosed.

FIG. 2 depicts another schematic view of the illustrative baffle assembly 100, according to one or more embodiments disclosed. The baffles 150 of the baffle assembly 100 can also be arranged in rows 212, 214 along the X-axis. Each successive baffle in the same row can have the same orientation as an adjacent baffle in the same row. For example, baffles 202, 222, and 242 in row 312 can each have the same orientation with respect to the Y-axis and the Z-axis and baffles 204, 224, and 244 can each have the same orientation with respect to the Y-axis and the Z-axis. In an example, three baffles having the first orientation 102, 202, 222, and 242, can be axially offset from one another in row 212, and at least three baffles having the second orientation 104, 204, 224, and 244, can be axially offset from one another in row 214.

Each row 212, 214 can include any number of successive baffles 150. For example, each row 212, 214 can include at least 2, at least 5, at least 10, at least 25, at least 50, at least 75, at least 100, at least 150, at least 250, at least 500, or at least 1,000 successive baffles. For example, each row 212, 214 can include form 2 to 1,000, from 10 to 500, from 25 to 250, from 45 to 150, or from 75 to 125 successive baffles. As shown in FIG. 2, rows 212 and 214 can each contain at least 3 baffles.

Each adjacent baffle in each row 212, 214 can be separated from one another in the X-direction by a distance 216. Each distance 216 can be from a low of about 0.05 cm, about 0.1 cm, about 0.5 cm, about 1 cm, about 2 cm, or about 3 cm to a high of about 5 cm, about 7 cm, about 10 cm, about 15 cm, about 25 cm, or about 50 cm. For example, the distance 216 can be from about 0.3 cm to about 20 cm, from about 0.5 cm to about 12 cm, from about 0.75 cm inch to about 9 cm, from about 1.25 cm to about 6 cm, from about 1.75 cm to about 4 cm, or from about 2.25 cm to about 3.5 cm.

The baffles 150 can be arranged in accordance with both FIGS. 1 and 2 to at least partially form a matrix of baffles that can span a cross-section of a vessel having any size or shape, resulting in a layer of baffles (not shown). Two or more of these layers of baffles can be stacked within the vessel to form a stacked baffle arrangement or contacting zone within the vessel (see item number 850 of FIG. 8). The baffles 150 of the contacting zone can be arranged or oriented with any angle or angles, as described above, such that a circumference or perimeter of each layer of the stacked baffle arrangement can be contoured to or flush with interior walls of the vessel. Having each layer of the stacked baffle arrangement contoured to the interior walls of the vessel can minimize open channels, increasing the effectiveness of the baffles 150.

Figure 3:
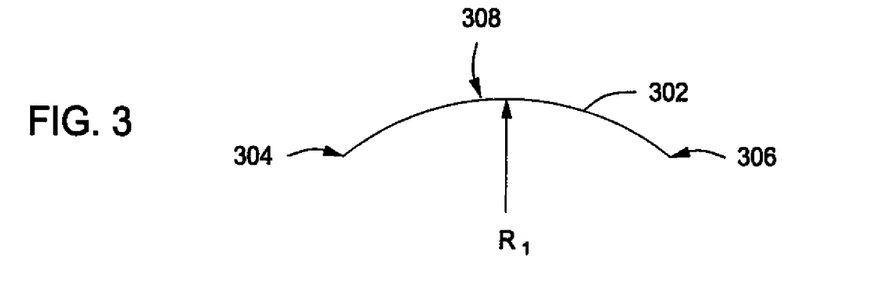
FIG. 3 depicts a schematic end view of an illustrative baffle having a curved surface that can be used with the baffle assembly of FIGS. 1 and 2.

At least one surface of the baffles 150 can be at least partially non-planar or curved, for example. For example, any one or more of the baffles 150 can have curved major surface. The curved surface can be of any shape or degree of curvature. These non-planar baffles can include one or more curves at any location between each side of the baffle. FIG. 3 depicts an end view of an illustrative baffle 302 having a curved surface 308, according to one or more embodiments. The curved surface 308 can span a length from a first side 304 to a second side 306 of the baffle 302. The degree of curvature of the curved baffle can be described by a height to width ratio from a low of about 2:1, about 1:1, about 1:2, about 1:4, or about 1:5 to a high of about 1:7, about 1:8, about 1:10, about 1:15, or about 1:20.

The curved surface 308 of the baffle 302 can be represented by a radius of curvature $R_1$ The radius of curvature $R_1$ can be from a low of about 0.1, about 0.4, about 0.6, about 0.8, about 1, or about 2 to about 4, about 5, about 6, about 8, or about 10 times the length of the curved surface 308, from the first side 304 to the second side 306. For example, the radius of curvature $R_1$ can be from about 0.25 to about 9, from about 0.65 to about 7, about 0.75 to about 4.5, about 0.85 to about 3, or about 1.25 to about 2.5 times the length of the curved surface 308.

Figure 4:
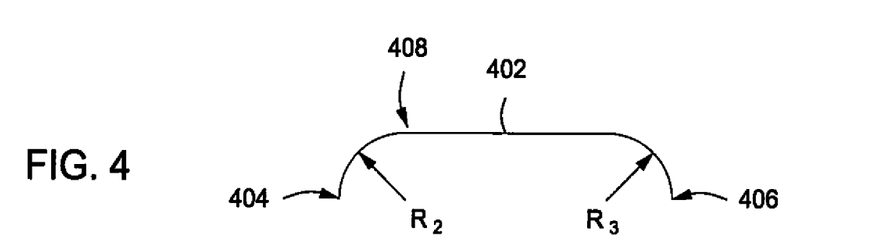
FIG. 4 depicts a schematic end view of another illustrative baffle having a curved surface that can be used with the baffle assembly of FIGS. 1 and 2.

FIG. 4 depicts a cross-sectional end view of another illustrative baffle 402 having a curved surface 408, according to one or more embodiments disclosed. The surface 408 can include two curves, as shown, disposed along a length of the surface 408 between a first side 404 and a second side 408 of the baffle 402. As shown, the surface 408 of the baffle 402 can have two radii of curvature, $R_2$ and $R_3$. The surface 408 of the baffle 402 can include a first curve having a radius of curvature $R_2$ and a second curve having a radius of curvature $R_3$. The first and second curves can be separated by at least one planar portion of the surface 408. $R_2$ and $R_3$ can be the same or different. $R_2$ can be from a low of about 0.01, about 0.05, about 0.1, about 0.2, about 0.3, or about 0.4 to about 0.6, about 0.8, about 1, about 1.5, or about 2 times the length of the surface 408, from the first side 404 to the second side 406. For example, the radius of curvature $R_2$ can be from about 0.02 to about 1.2, from about 0.08 to about 0.8, about 0.13 to about 0.7, about 0.18 to about 0.5, or about 0.2 to about 0.4 times the length of the curved surface 408. $R_3$ can also be from a low of about 0.01, about 0.05, about 0.1, about 0.2, about 0.3, or about 0.4 to about 0.6, about 0.8, about 1, about 1.5, or about 2 times the length of the surface 408, from the first side 404 to the second side 406. For example, the radius of curvature $R_3$ can be from about 0.02 to about 1.2, from about 0.08 to about 0.8, about 0.13 to about 0.7, about 0.18 to about 0.5, or about 0.2 to about 0.4 times the length of the curved surface 408.

Figure 5:
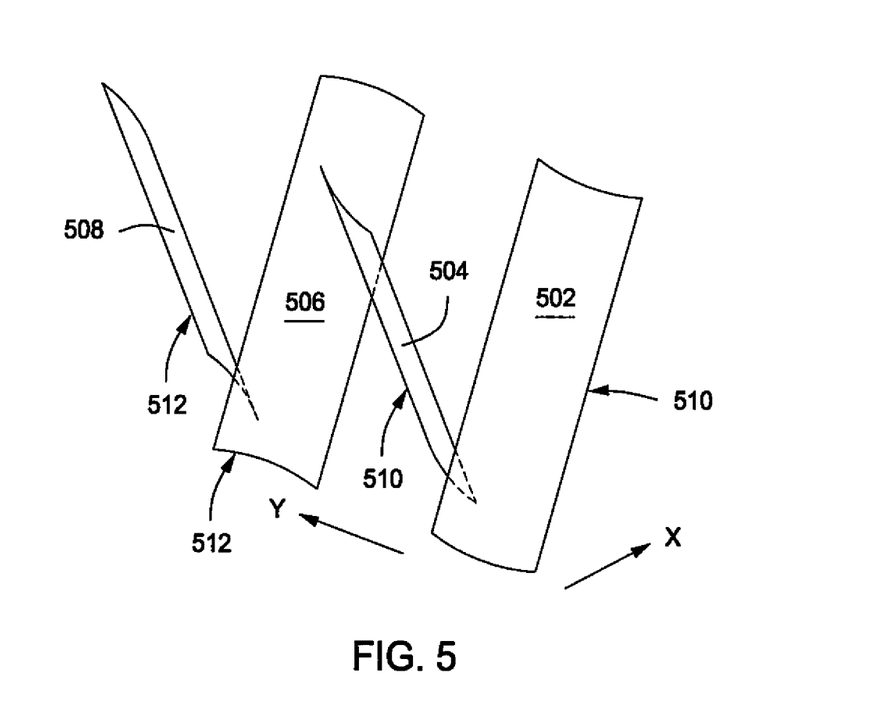
FIG. 5 depicts a schematic view of another illustrative baffle assembly that includes baffles having curved surfaces, according to one or more embodiments disclosed.

FIG. 5 depicts a schematic view of another illustrative baffle assembly including baffles 502, 504, 506, 508 having curved surfaces, according to one or more embodiments. The baffles 150 can include baffles 502, 504, 506, 508. The baffles 502, 504, 506, 508 can be arranged in accordance with the baffle assembly 100, as shown in FIGS. 1 and 2. A width of the baffles 502, 504, 506, 508 can generally be positioned along the Y-axis. The curved baffles 502 can have a convex surface or a concave surface along a single direction of the X-axis. For example, as shown in FIG. 5, the baffles 502, 504 each having a convex surface 510 can be disposed adjacent to baffles 506,

508 each having a concave surface 512 in a position along the Y-axis. Each baffle 502, 504, 506, 508 can have an angle β, as discussed above, with respect to the Z-axis and an angle α, as discussed above, with respect to the Y-axis. As shown in FIG. 5, and as discussed above, the baffles 502, 504, 506, 508 can be oriented so that successive or alternating baffles are sloped or oriented in opposite directions with respect to one another. In an alternate embodiment (not shown), the baffles 502 and 506 can have a convex surface along a direction of the X-axis and baffles 504 and 508 can have a concave surface along the direction of the X-axis.

Figure 6:
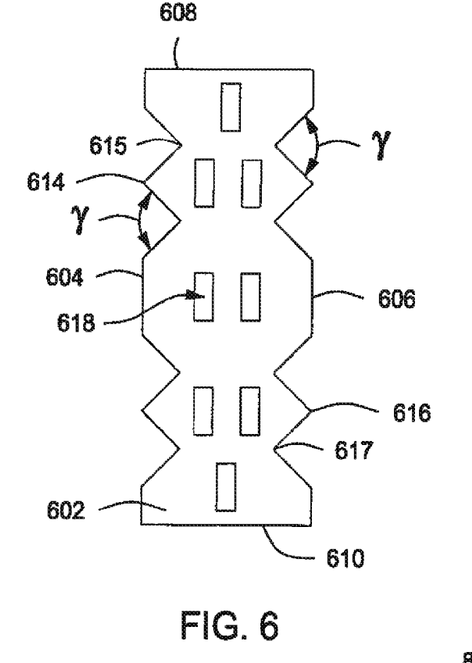
FIG. 6 depicts a schematic view of an illustrative baffle having a plurality of teeth and a plurality of perforations that can be used with the baffle assembly of FIGS. 1 and 2.
Figure 7:
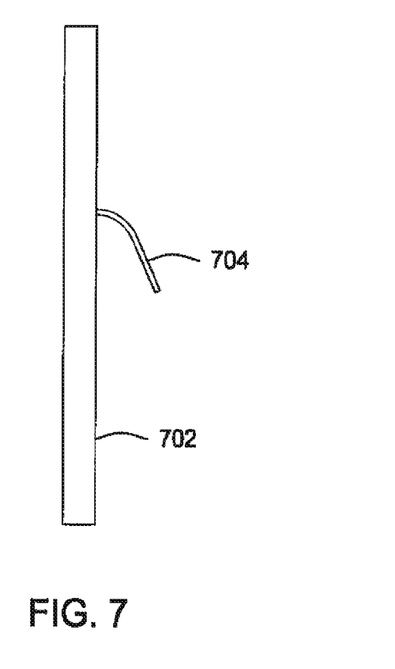
FIG. 7 depicts a side-view of an illustrative baffle having a punch tab that can be used with the baffle assembly of FIGS. 1 and 2.

The baffles 150 can include serrations, protrusions, and/or perforations as shown in FIGS. 6 and 7. FIG. 6 depicts a schematic view of an illustrative baffle 602 having a plurality of teeth 614 and a plurality of perforations 618, according to one or more embodiments. The baffle 602 can have first and second straight sides 608 and 610, respectively. The baffle 602 can include first and second serrated sides 604 and 606, respectively. The first serrated side 604 can include alternating teeth 614 and notches 615 of a generally V-shaped configuration. The notches 615 can have an angle γ that can be from a low of about 5°, about 10°, about 20°, about 30°, about 40°, or about 50° to a high of about 70°, about 80°, about 90°, about 100°, about 110°, about 120° or more. For example, the angle γ can be from about 25° to about 130°, about 35° to about 125°, about 45° to about 120°, about 60° to about 120°, about 80° to about 100°, or about 88° to about 92°.

The second serrated side 606 can also include alternating teeth 616 and notches 617 of a generally V-shaped configuration. The notches 617 can have an angle γ that can be from a low of about 5°, about 10°, about 20°, about 30°, about 40°, or about 50° to a high of about 70°, about 80°, about 90°, about 100°, about 110°, about 120° or more. For example, the angle γ can be from about 25° to about 130°, about 35° to about 125°, about 45° to about 120°, about 60° to about 120°, about 80° to about 100°, or about 88° to about 92°. The teeth 616 of the second serrated side 606 can alternate with the teeth 614 of the first serrated side 604 such that the notches 617 of the second serrated side 606 are horizontally aligned with the teeth 614, and the teeth 616 are horizontally aligned with the notches 615 of the first serrated side 604. In an alternate embodiment (not shown), the teeth 616 can be horizontally offset from the notches 615 and the notches 617 can be horizontally offset from the teeth 614.

The baffle 602 can also include a plurality of perforations or holes 618. The holes 618 can include gaps, slits, punctures, or any other opening. The holes 618 can have any shape, for example, the holes can be round, oval, square, triangular, polygonal, or rectangular (as shown). The holes 618 can be arranged in vertical and/or horizontal rows. Two, three, four, or more rows of holes 618 can be arranged in each baffle 902. The plurality of holes 618 can have an alternating or staggered arrangement (not shown) along a length of the baffle 602, from the first straight side 608 to the second straight side 610. In another example (not shown), the plurality of holes 618 can be randomly placed along the length of the baffle 602, from the first straight side 608 to the second straight side 610.

The size of the teeth, notches, and holes can depend, at least in part, upon particle sizes of the solids and/or volumetric flow rates. For example, the size of the holes 618 can be sufficient to allow FCC catalyst particles, which can have particles sizes from about 20 to about 160 microns in diameter, to pass therethrough. The rectangular holes 618 can have a length from a low of about 0.5 cm, about 0.75 cm, about 1 cm, about 1.5 cm, or about 2 cm to a high of about 3 cm, about 4 cm, about 6 cm, about 8 cm, or about 10 cm. The rectangular holes 618 can have a width from a low of about 0.2 cm, about 0.5 cm, about 0.75 cm, about 1 cm, or about 1.5 cm to a high of about 2 cm, about 3 cm, about 4 cm, about 5 cm, or about 6 cm. In an embodiment (not shown), the holes 618 can be round and can have a diameter from a low of about 0.2 cm, about 0.5 cm, about 0.75 cm, about 1 cm, or about 1.5 cm to a high of about 2 cm, about 3 cm, about 4 cm, about 5 cm, about 7 cm, or about 9 cm.

FIG. 7 depicts a side-view of an illustrative baffle 702 having a punch tab 704, according to one or more embodiments. The punch tab 704 can be formed from the baffle and can be obtained by punching the hole 618 into a surface of the baffle 702. The punch tab 704 can extend from the baffle 702 in any direction. For example, the punch tab 704 can extend upwardly, downwardly, or laterally from the baffle 702. As shown in FIG. 7, the punch tab 704 can extend downwardly. The punch tab 704 can provide additional shearing points for rising gas bubbles that can be present during operation. Also during operation, the punch tab 704 can provide an extended surface area that can be used to further distribute falling catalyst particles.

Each baffle described herein can be fabricated from suitable metals, metal alloys, composite materials, polymeric materials, or the like. For example, the baffles can be composed of carbon steel, carbon steel alloys, low chrome steel, stainless steel, stainless steel alloys, nickel, nickel alloys, non-ferrous metals, non-ferrous metal alloys, or any combination thereof. In another example, each baffle can be composed of ceramic, plastic, polycarbonate, acrylic, polyvinyl chloride, nylon, polysulfone, and the like.

A plurality of vertical columns of the baffles 150 can be disposed within a housing or vessel, according to one or more embodiments (not shown). The plurality of vertical columns of baffles 150 can be disposed within the vessel such that a plurality of the baffles 150 can be disposed continuously across a cross-section of an interior of the vessel. Disposing the baffles 150 continuously across the cross-section of the vessel can reduce or eliminate channeling of down-flowing catalyst or up-flowing gases during operation. The plurality of vertical columns of baffles 150 can include the baffles depicted herein in FIGS. 1-7, such as the baffles 150 in baffle arrangement 100 depicted in FIGS. 1 and 2.

For example, each vertical column can include two or more layers of baffles 150 having the baffle arrangement 100. Each layer of baffles 150 can be disposed one on top of another, forming the vertical columns. The vertical columns can include any number of layers of baffle arrangements 100. For example, the vertical columns can include from a low of 2, 4, or 6 to a high of 10, 15, or 30 layers or more of baffle arrangements 100. In another example, each vertical column can include a vertical stack of a single baffle 150. For example, individual baffles 150 having the first orientation 102 can be stacked vertically into a vertical column (not shown) and the vertical column can be disposed adjacent to other vertical columns, such as a vertical column of individual baffles 150 having the second orientation 104, to form the baffle arrangements 100. The vertical columns of baffles 150 can span a cross-section of the vessel (not shown). As discussed above, the baffles 150 can be arranged or oriented with any angle or angles, as described above, such that a circumference or perimeter of each layer of the stacked baffle arrangement can be contoured to the interior walls of the vessel.

Each of the vertical columns can have a vertical length that can be at least as long as a depth of a fluidized bed present in the vessel during operation. The vertical columns can be vertically installed inside the vessel. The vertical installation (not shown) of the vertical columns can include hanging the vertical columns from an upper portion of the vessel, such as a dilute phase zone above the bed (not shown). As such, the vertical columns can be supported in the vessel without the need for a bottom support structure. The lack of a bottom support structure can increase the capacity of the baffle arrangements within the vessel. Once installed, at least one of the vertical columns can be removed to allow access to a lower part of the vessel for maintenance or inspection.

Figure 8:
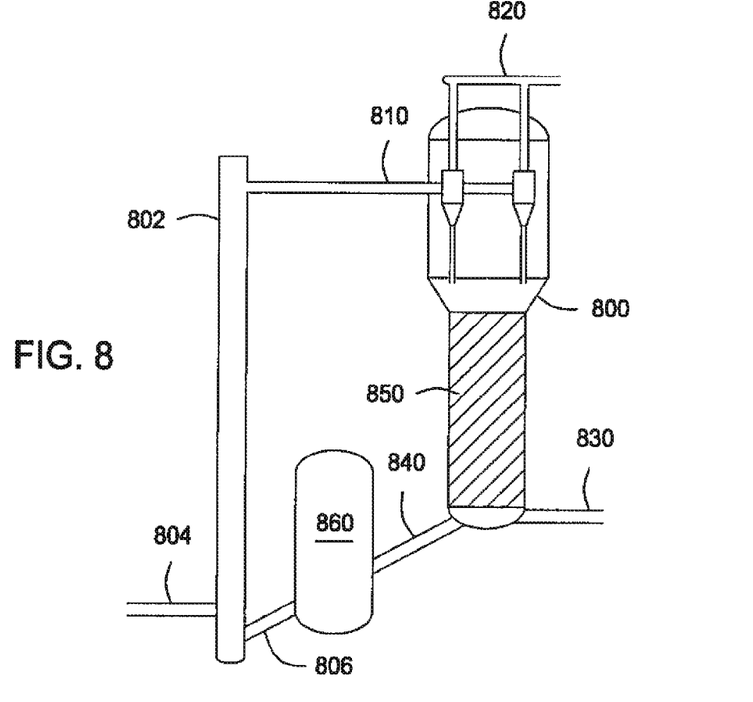
FIG. 8 depicts a schematic of an illustrative stripping unit of a fluid catalytic cracking system, according to one or more embodiments disclosed.

FIG. 8 depicts a schematic view of an illustrative stripping unit of a fluid catalytic cracking ("FCC") system, according to one or more embodiments disclosed. The FCC system can include one or more risers or reaction risers 802. The FCC system can also include one or more transfer lines 810 and one or more catalyst strippers 800. A hydrocarbon or feed via line 804 and a catalyst via line 806 can be introduced to the riser 802. The hydrocarbon can be cracked within the riser 802 in the presence of the catalyst under conditions sufficient to form a cracked product and spent catalyst mixture or "riser effluent." The riser effluent can be recovered from the riser and introduced to the stripper 800 via transfer line 810.

The catalyst can be or include any catalyst suitable for the conversion of hydrocarbons. The catalyst can include a zeolite, an amorphous material, and/or a porous matrix. For example, the catalytic component can be, but is not limited to, ZSM-5, ZSM-11, ZSM-12, ZSM-22, ZSM-23, ZSM-35, ZSM-48, zeolite X, zeolite Y, USY, REY, RE-USY, MCM-9, MCM-22, MCM-41, SAPO-5, SAPO-37, SAPO-40, naturally occurring zeolites such as faujasite, mordenite, and the like, or any combination thereof. In another example, the catalytic component can include boehmite, pseudoboehmite alumina, peptized pseudoboehmite alumina (PSA), alumina-containing gels, hydrotalcites, bauxite, and the like, or any combination thereof. In a further example, the catalytic component can include one or more bottoms cracking additives such as BCMT™-500, BCMT™-500 LRT, BCMT™-DC, and BCMT™-MD, all commercially available from Albermarle Corporation, and BCA-105®, commercially available from the InterCat division of Johnson Mathey Corporation.

The catalytic component can be supported on, in, or otherwise about a support material, matrix, or binder. Illustrative support materials can include, but are not limited to, alumina, silica gel, and/or naturally occurring clays. The support material can be catalytically active or inactive. The active support material, or active matrix, can include boehmite, pseudoboehmite alumina, peptized pseudoboehmite alumina (PSA), or alumina-containing gels.

The catalyst particles can have any particle size suitable for use as an FCC catalyst. In an example, the catalyst particles can have particles sizes from a low of about 1 micron, about 5 microns, about 10 microns, about 15 microns, about 20, about 30 microns, or about 50 microns to a high of about 100 microns, about 120 microns, about 140 microns, about 160 microns, about 180 microns, about 200 microns, about 500 microns or more in diameter. For example, the catalyst particle sizes can be from about 4 microns to about 250 microns, from about 12 microns to about 175 microns, from about 20 microns to about 160 microns, from about 45 to about 125 microns, or from about 75 to about 95 microns in diameter.

The catalyst-to-hydrocarbon weight ratio can range from about 2:1 to about 35:1, from about 2:1 to about 30:1, from about 5:1 to about 25:1, from about 10:1 to about 20:1, or from about 15:1 to about 18:1. The riser 802 can be operated at a temperature from a low of about 450° C., about 475° C., about 500° C., about 525° C., about 550° C., or about 575° C. to a high of about 635° C., about 655° C., about 675° C., about 700° C., about 750° C., or about 825° C. For example, the riser can be operated at a temperature from about 400° C. to about 675° C., from about 605° C. to about 670° C., from about 610° C. to about 660° C., or from about 615° C. to about 650° C. In at least one specific embodiment, the riser 802 can be operated at a temperature of about 605° C., about 615° C., about 625° C., about 630° C., about 640° C., or about 650° C.

As used herein, reference to a riser temperature shall mean the temperature of the riser effluent exiting at the top of the riser 802. The thermal equilibrium of the riser feed can be lower than the riser exit temperature, and the temperature can vary throughout the riser 802 depending on the reactions. The pressure in the riser 802 can be from a low of about 40 kPa, about 55 kPa, about 65 kPa, or about 70 kPa to a high of about 650 kPa, about 675 kPa, about 700 kPa, or about 725 kPa. Other operating conditions can be as discussed and described in U.S. Pat. No. 7,128,827. In at least one specific embodiment, the hydrocarbon can be heated within the riser 802 to a temperature of about 590° C. to about 675° C. at a pressure of about 68 kPa to about 690 kPa. The velocity of the reaction mixture flowing through the riser 802 can be from about 3 m/sec to about 27 m/sec, about 6 m/sec to about 25 m/sec, or about 9 m/sec to about 21 m/sec. The residence time of the reaction mixture in the riser 802 can be less than about 20 seconds, less than about 10 seconds, less than about 8 seconds, less than about 4 seconds, or less than about 2 seconds.

Illustrative feeds, reactor units, and operating conditions can also be as discussed and described in U.S. Pat. Nos. 6,106,697; 7,011,740; 7,128,827; 7,153,479; 7,270,739; 7,435,331; 7,491,315; 7,611,622; and 7,820,033 and U.S. Patent Application Publication Nos.: 2002/0003103; 2002/0189973; 2009/0299118; 2009/0299119; 2011/0251046; and 2012/0165591.

The product mixture can flow, via a transfer line 810, to the stripper 800, where the spent catalyst particulates and/or other particulates can be separated from gaseous hydrocarbons, steam, and inerts. The stripper 820 can include the baffles 150 depicted herein in FIGS. 1-7, such as the baffle arrangements depicted in FIGS. 1, 2, and 5 and any combination thereof. For example, the baffles 150 can be contained in a contacting zone 850 of the stripper 800. The stripper 800 can have a larger cross-sectional area than the reaction riser and/or the transfer line 810, which can reduce the velocity of the cracked product mixture, allowing the heavier spent catalyst particulates and/or other particulates to separate from the gaseous hydrocarbons, steam, and inerts. A steam purge via line 830 can be introduced to the stripper 800 to assist in separating the gaseous hydrocarbons from the spent catalyst particulates, i.e., stripping the gaseous hydrocarbons from the solids.

In the stripper 800, the spent catalyst particulates can fall via gravity from a dilute phase to contact the baffles 150 in the contacting zone 850. At the same time, rising gases, such as steam, can flow upward through the stripper to contact the baffles in the contacting zone 850 and the falling spent catalyst particles. The steam can be introduced at any location below the contacting zone 850. It is also contemplated herein that the spent catalyst particles can flow upward, laterally, or in any other direction when approaching the contacting zone 850. The steam can also be introduced to the stripper 800 concurrently and/or counter currently with the spent catalyst particles.

The baffles contained in the contacting zone 850 of the stripper 800 can include the baffle arrangement 100 having baffles 150 as depicted in FIGS. 1 and 2, for example. The angles α and/or β can be at any degree appropriate to prevent solids from reposing or accumulating on the baffles. The angles α and/or β can depend, inter alia, on the size, shape, and/or weight of the particles as well as the flow rate or velocity of the particles as they encounter or contact the baffle arrangement 100. Each baffle 150 can also have an angle α that can be at any degree appropriate to prevent gaseous bubbles from forming and/or coalescing on an underside of each baffle. The angle α can also depend, inter alia, on the size, shape, and/or weight of the particles as well as the flow rate or velocity of the particles as they encounter or contact the baffle arrangement 100.

Gaps 120 can be at least partially disposed between each baffle 150 having orientations 102, 104 as shown in FIG. 1. These gaps 120 can provide passageways so that solids and/or fluids can travel from one end of the stripper 800 to the other. Each baffle 150 can be in contact with an adjacent baffle 150. For example, each baffle 150 having orientations 102, 104 can contact or connect to one another along the Y-axis via one or more connection points or welds 210. The welds 210 can act as a bubble formation point that can shear large bubbles into smaller bubbles when falling particles contact rising gases in the presence of the baffles 150.

The steam introduced via line 830 to the stripper 800 can be saturated. The pressure of the saturated steam can be from about 101 kPa to about 6,000 kPa, about 500 kPa to about 6,000 kPa, or about 2,000 kPa to about 6,000 kPa. For example, the pressure of the saturated steam via line 830 can range from about 101 kPa to about 8,300 kPa, about 101 kPa to about 4,000 kPa, or about 101 kPa to about 2,000 kPa.

The steam introduced via line 830 to the stripper 800 can be superheated. The pressure of the superheated steam can be from a low of about 100 kPa to a high of about 8,500 kPa. The pressure of the superheated steam via line 830 can range from about 100 kPa to about 8,300 kPa, about 100 kPa to about 4,000 kPa, or about 100 kPa to about 2,000 kPa. The temperature of the superheated steam via line 830 can be a minimum of about 200° C., about 230° C., about 260° C., or about 290° C. The steam can be introduced via line 830 to the stripper 800 at a rate proportionate to the product mixture introduced via line 810. In one example, the steam-to-product mixture weight ratio can range from about 1:10 to about 1:25 or about 1:5 to about 1:50. The steam-to-hydrocarbon weight ratio can remain constant or can vary.

The stripper 800 can separate from a low of about 90 wt %, about 90.5 wt %, about 91 wt %, or about 91.5 wt % to a high of about 98 wt %, about 99 wt %, about 99.5 wt %, or about 99.999 wt % of the particulates from the cracked product mixture via the transfer line 810. For example, the stripper 800 can separate of from about 90 wt % to about 99.9 wt %, about 95 wt % to about 99 wt %, or about 97.5 wt % to about 99.999 wt % of the particulates from the riser effluent via the transfer line 810. The stripper 800 can also separate from a low of about 85 wt %, about 90 wt %, about 93 wt %, or about 95 wt % to a high of about 98 wt %, about 99 wt %, about 99.5 wt %, or about 99.999 wt % of the hydrocarbon vapors contained in the spent catalyst mixture. For example, the stripper 800 can separate of from about 90 wt % to about 99.9 wt %, about 95 wt % to about 99 wt %, or about 97.5 wt % to about 99.999 wt % of the hydrocarbon vapors contained in the spent catalyst mixture via the transfer line 810.

The stripper 800 can produce a coked catalyst from the spent catalyst entering the stripper 800. The coked catalyst leaving the stripper 800 can have a hydrocarbon content less than that of the spent catalyst entering the stripper 800. The spent catalyst entering the stripper 800 can contain from a low of about 0.01 wt %, about 0.05 wt %, about 0.1 wt %, about 0.25 wt %, or about 0.5 wt % to a high of about 1 wt %, about 1.5 wt %, about 2 wt %, about 2.5 wt %, about 3 wt %, or about 5 wt %, about 7 wt %, or about 10 wt % hydrocarbons. The coked catalyst leaving the stripper 800 can contain from a low of about 0.001 wt %, about 0.01 wt %, about 0.05 wt %, about 0.1 wt %, or about 0.25 wt % to a high of about 0.5 wt %, about 1 wt %, about 1.25 wt %, about 1.5 wt %, about 2 wt %, about 2.5 wt %, about 3 wt %, or about 5 wt % hydrocarbons. The stripper 800 can reduce or eliminate from about 5 wt %, about 10 wt %, about 15 wt %, about 20 wt %, about 25 wt %, about 30 wt %, about 35 wt % to about 45 wt %, about 50 wt %, about 60 wt %, about 70 wt %, about 80 wt %, about 90 wt %, about 95 wt %, or about 99 wt % of a total amount of hydrocarbons present on the spent catalyst particles entering the stripper 800.

The gaseous hydrocarbons ("cracked product") via line 820 can be recovered from the stripper 800. The product in line 820 can be further processed (not shown), such as by dehydrating or fractionating to provide one or more finished products including, but not limited to, one or more olefins, paraffins, aromatics, mixtures thereof, and/or combinations thereof. For example, the product via line 820 can be introduced to a quench tower (not shown) that quenches the product and separates entrained catalyst particulates therefrom. Entrained catalyst particulates separated from the cracked product can then be recycled back to the reaction riser or to a regenerator (not shown). A suitable FCC system having a quench tower for quenching and separating entrained catalyst particulates from the riser effluent is discussed and described in U.S. Pat. Nos. 7,153,479 and/or 7,011,740.

The solids, i.e., spent catalyst particulates, can fall through the stripper 800 and can be introduced via line 840 to a regenerator 860. At least a portion of the solids can be introduced to the regenerator 860 after passing through the stripper 800. The stripped coked-catalyst particulates can be combined with one or more fluids within the regenerator 860 to provide a flue gas (not shown) and regenerated catalyst via line 806. The one or more fluids can include one or more oxidants and/or supplemental fuel. Illustrative oxidants can include, but are not limited to, air, oxygen, oxygen, oxygen-enriched air, ozone, hydrogen peroxide, an essentially nitrogen-free oxidant, or any combination thereof. As used herein, the term "essentially oxygen" refers to a fluid containing more than 50 vol % oxygen. As used herein, the term "oxygen-enriched air" refers to a fluid containing about 21 vol % oxygen to about 50 vol % oxygen. Oxygen-enriched air and/or essentially oxygen can be obtained, for example, from cryogenic distillation of air, pressure swing adsorption, membrane separation, or any combination thereof. As used herein, the term "essentially nitrogen-free," refers to an oxidant that contains about 5 vol % nitrogen or less, about 4 vol % nitrogen or less, about 3 vol % nitrogen or less, about 2 vol % nitrogen or less, or about 1 vol % nitrogen or less. The supplemental fuel can include any combustible material. For example, the supplemental fuel can include, but is not limited to, $C_1$ to $C_{20}$ hydrocarbons and/or carbon. The supplemental fuel can be introduced to the regenerator 860 as a liquid, gas, solid, or any combination thereof. The supplemental fuel can be introduced in a separate line from the oxidant. The oxidants can react with the carbonaceous matter on the coked catalyst particulates to combust or otherwise burn the carbon ("coke") off the surface of the catalyst particulate. Should the supplemental fuel be introduced, the oxidants can react with the supplemental fuel to combust the supplemental fuel and generate heat. The removal of the coke from the surface of the catalyst particulates re-exposes the reactive surfaces of the catalyst particulates, thereby "regenerating" the catalyst particulates and permitting reuse thereof. Combustion by-products, such as carbon monoxide, nitrogen oxides, nitrogen oxide precursors, and carbon dioxide, can be removed from the regenerator 860 as a waste or flue gas. The regenerated catalyst particulates can be recovered, which can be recycled to the riser 802. Fresh, unused, catalyst can be added (not shown) to the regenerator 860, the regenerated catalyst in line 806, and/or to the riser 802.

Embodiments of the present disclosure further relate to any one or more of the following paragraphs:

1. A system for contacting solids with a fluid, comprising: a first baffle having a latitudinal centerline that is in a plane defined by first and second axes, the latitudinal centerline of the first baffle being oriented at a first angle from about 5° to about 80° with respect to the second axis; a second baffle axially offset from the first baffle along the second axis and having a latitudinal centerline in the plane that is oriented at a second angle from about 100° to about 175° with respect to the second axis; and a third baffle axially adjacent to the second baffle along the second axis and having a latitudinal centerline in the plane that is oriented at a third angle from about 5° to about 80° with respect to the second axis.

2. The system according to paragraph 1, wherein the first and third bathes each have a longitudinal centerline at a fourth angle from about 15° to about 60° with respect to a third axis, wherein the third axis is perpendicular to the second axis.

3. The system according to paragraph 2, wherein the second baffle has a longitudinal centerline at a fifth angle from about 120° to about 165° with respect to the third axis.

4. The system according to paragraph 3, further comprising a fourth baffle disposed adjacent to the third baffle, wherein the fourth baffle has a latitudinal centerline at the second angle and a longitudinal centerline at the fifth angle.

5. The system according to any one of paragraphs 1 to 4, wherein the first and third angles are the same, and wherein the first angle is from about 20° to about 70° with respect to the second axis, and the second angle is from about 110° to about 160° with respect to the second axis.

6. The system according to any one of paragraphs 1 to 5, wherein the first baffle comprises a curved surface having a height to width ratio from about 2:1 to about 1:10.

7. The system according to any one of paragraphs 1 to 6, further comprising a fifth baffle axially offset from the first baffle along the first axis.

8. The system according to paragraph 7, wherein the fifth baffle has a latitudinal centerline in the plane that is oriented at the first angle from about 5° to about 80° with respect to the second axis.

9. The system according to any one of paragraphs 1 to 8, wherein at least one side of the first baffle comprises alternating teeth and notches in a V-shaped configuration.

10. The system according to any one of paragraphs 1 to 9, wherein the first, second, and third baffles are disposed in a vessel in fluid communication with a fluid catalytic cracking reactor.

11. The system according to paragraph 10, wherein the first, second, and third baffles at least partially form a layer of baffles that spans a cross-section of the vessel.

12. A fluidized catalytic cracking stripping system, comprising: a vessel; a baffle arrangement suspended from an upper portion of the vessel, the baffle arrangement comprising: a first plurality of baffles arranged along a Y-axis and a second plurality of baffles arranged along a X-axis; a first baffle having a latitudinal centerline that is in a plane defined by the X and Y axes, the latitudinal centerline of the first baffle being oriented at a first angle from about 5° to about 80° with respect to the Y-axis; a second baffle axially offset from the first baffle along the Y-axis and having a latitudinal centerline in the plane that is oriented at a second angle from about 100° to about 175° with respect to the Y-axis; a third baffle axially offset from the second baffle along the Y-axis and having a latitudinal centerline in the plane that is oriented at a third angle from about 5° to about 80° with respect to the Y-axis; and a fourth baffle axially offset from the first baffle along the X-axis and having a latitudinal centerline in the plane that is oriented at the first angle; and a steam line coupled to the vessel and adapted to transfer steam to the vessel.

13. The system according to paragraph 12, wherein the first and third baffles each have a longitudinal centerline at a fourth angle from about 15° to about 60° with respect to a Z-axis, wherein the Z-axis is perpendicular to the X and Y axes, and wherein the second baffle has a longitudinal centerline at a fifth angle from about 120° to about 165° with respect to the Z-axis.

14. The system according to paragraphs 12 or 13, wherein the first and third angles are the same, and wherein the first angle is from about 20° to about 70° with respect to the Y-axis, and the second angle is from about 110° to about 160° with respect to the Y-axis.

15. The system according to any one of paragraphs 12 to 14, wherein two sides of the first baffle comprise alternating teeth and notches in a V-shaped configuration.

16. The system according to any one of paragraphs 12 to 15, wherein the first baffle comprises a punch tab extending downwardly from a surface of the first baffle.

17. A method for stripping spent catalyst, comprising: separating a cracked effluent comprising a spent catalyst to provide a recovered spent catalyst and a cracked product; contacting the recovered spent catalyst with a baffle arrangement, comprising: a first plurality of baffles arranged along a Y-axis and a second plurality of baffles arranged along a X-axis; a first baffle having a latitudinal centerline that is in a plane defined by the X and Y axes, the latitudinal centerline of the first baffle being oriented at a first angle from about 5° to about 80° with respect to the Y-axis; a second baffle axially offset from the first baffle along the Y-axis and having a latitudinal centerline in the plane that is oriented at a second angle from about 100° to about 175° with respect to the Y-axis; a third baffle axially offset from the second baffle along the Y-axis and having a latitudinal centerline in the plane that is oriented at a third angle from about 5° to about 80° with respect to the Y-axis; and a fourth baffle axially offset from the first baffle along the X-axis and having a latitudinal centerline in the plane that is oriented at the first angle; and contacting the recovered spent catalyst and the baffle arrangement with steam; and separating hydrocarbons from the spent catalyst to produce a coked catalyst having a reduced concentration of hydrocarbons.

18. The method according to paragraph 17, wherein the steam is superheated steam having a pressure of about 100 kPa to about 8,300 kPa and a temperature of at least about 200° C.

19. The method according to paragraphs 17 or 18, wherein the coked catalyst comprises from about 0.01 wt % to about 5 wt % hydrocarbons.

20. The method according to any one of paragraphs 17 to 19, wherein the plurality of baffles is vertically suspended from an upper portion of a vessel.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for contacting solids with a fluid, comprising:
   a first baffle having a latitudinal centerline that is in a plane defined by first and second axes, the latitudinal centerline of the first baffle being oriented at a first angle from about 5° to about 80° with respect to the second axis;
   a second baffle axially offset from the first baffle along the second axis and having a latitudinal centerline in the plane that is oriented at a second angle from about 100° to about 175° with respect to the second axis; and
   a third baffle axially adjacent to the second baffle along the second axis and having a latitudinal centerline in the plane that is oriented at a third angle from about 5° to about 80° with respect to the second axis.

2. The system of claim 1, wherein the first and third baffles each have a longitudinal centerline at a fourth angle from about 15° to about 60° with respect to a third axis, wherein the third axis is perpendicular to the second axis.

3. The system of claim 2, wherein the second baffle has a longitudinal centerline at a fifth angle from about 120° to about 165° with respect to the third axis.

4. The system of claim 3, further comprising a fourth baffle disposed adjacent to the third baffle, wherein the fourth baffle has a latitudinal centerline at the second angle and a longitudinal centerline at the fifth angle.

5. The system of claim 1, wherein the first and third angles are the same, and wherein the first angle is from about 20° to about 70° with respect to the second axis, and the second angle is from about 110° to about 160° with respect to the second axis.

6. The system of claim 1, wherein the first baffle comprises a curved surface having a height to width ratio from about 2:1 to about 1:10.

7. The system of claim 1, further comprising a fifth baffle axially offset from the first baffle along the first axis.

8. The system of claim 7, wherein the fifth baffle has a latitudinal centerline in the plane that is oriented at the first angle from about 5° to about 80° with respect to the second axis.

9. The system of claim 1, wherein at least one side of the first baffle comprises alternating teeth and notches in a V-shaped configuration.

10. The system of claim 1, wherein the first, second, and third baffles are disposed in a vessel in fluid communication with a fluid catalytic cracking reactor.

11. The system of claim 10, wherein the first, second, and third baffles at least partially form a layer of baffles that spans a cross-section of the vessel.

12. A fluidized catalytic cracking stripping system, comprising:
    a vessel;
    a baffle arrangement suspended from an upper portion of the vessel, the baffle arrangement comprising:
       a first plurality of baffles arranged along a Y-axis and a second plurality of baffles arranged along a X-axis;
       a first baffle having a latitudinal centerline that is in a plane defined by the X and Y axes, the latitudinal centerline of the first baffle being oriented at a first angle from about 5° to about 80° with respect to the Y-axis;
       a second baffle axially offset from the first baffle along the Y-axis and having a latitudinal centerline in the plane that is oriented at a second angle from about 100° to about 175° with respect to the Y-axis;
       a third baffle axially offset from the second baffle along the Y-axis and having a latitudinal centerline in the plane that is oriented at a third angle from about 5° to about 80° with respect to the Y-axis; and
       a fourth baffle axially offset from the first baffle along the X-axis and having a latitudinal centerline in the plane that is oriented at the first angle; and
    a steam line coupled to the vessel and adapted to transfer steam to the vessel.

13. The system of claim 12, wherein the first and third baffles each have a longitudinal centerline at a fourth angle from about 15° to about 60° with respect to a Z-axis, wherein the Z-axis is perpendicular to the X and Y axes, and wherein the second baffle has a longitudinal centerline at a fifth angle from about 120° to about 165° with respect to the Z-axis.

14. The system of claim 12, wherein the first and third angles are the same, and wherein the first angle is from about 20° to about 70° with respect to the Y-axis, and the second angle is from about 110° to about 160° with respect to the Y-axis.

15. The system of claim 12, wherein two sides of the first baffle comprise alternating teeth and notches in a V-shaped configuration.

16. The system of claim 12, wherein the first baffle comprises a punch tab extending downwardly from a surface of the first baffle.

* * * * *